US012493779B2

(12) United States Patent
Li et al.

(10) Patent No.: US 12,493,779 B2
(45) Date of Patent: Dec. 9, 2025

(54) SGCNAX: A SCALABLE GRAPH CONVOLUTIONAL NEURAL NETWORK ACCELERATOR WITH WORKLOAD BALANCING

(71) Applicant: The George Washington University, Washington, DC (US)

(72) Inventors: Jiajun Li, Arlington, VA (US); Ahmed Louri, Vienna, VA (US)

(73) Assignee: The George Washington University, Washington, DC (US)

( * ) Notice: Subject to any disclaimer, the term of this patent is extended or adjusted under 35 U.S.C. 154(b) by 1029 days.

(21) Appl. No.: 17/551,876

(22) Filed: Dec. 15, 2021

(65) Prior Publication Data

US 2022/0188613 A1 Jun. 16, 2022

Related U.S. Application Data

(60) Provisional application No. 63/125,760, filed on Dec. 15, 2020.

(51) Int. Cl.
*G06N 3/063* (2023.01)
*G06F 7/544* (2006.01)
*G06F 17/16* (2006.01)

(52) U.S. Cl.
CPC .......... *G06N 3/063* (2013.01); *G06F 7/5443* (2013.01); *G06F 17/16* (2013.01)

(58) Field of Classification Search
CPC .............. G06F 17/15–153; G06F 17/16; G06F 7/5443; G06N 3/063
See application file for complete search history.

(56) References Cited

U.S. PATENT DOCUMENTS

| 5,226,171 A | * | 7/1993 | Hall | ............... G06F 15/8076 712/3 |
| 2018/0046900 A1 | * | 2/2018 | Dally | ................. G06F 9/30018 |

(Continued)

OTHER PUBLICATIONS

J. Li, H. Zheng, K. Wang and A. Louri, "SGCNAX: A Scalable Graph Convolutional Neural Network Accelerator With Workload Balancing," in IEEE Transactions on Parallel and Distributed Systems, vol. 33, No. 11, pp. 2834-2845, Nov. 1, 2022 (Year: 2022).*

(Continued)

*Primary Examiner* — Matthew D Sandifer
(74) *Attorney, Agent, or Firm* — BLANK ROME LLP

(57) ABSTRACT

We introduce SGCNAX, a scalable GCN accelerator architecture for the high-performance and energy-efficient acceleration of GCNs. Unlike prior GCN accelerators that either employ limited loop optimization techniques, or determine the design variables based on random sampling, we systematically explore the loop optimization techniques for GCN acceleration and provide a flexible GCN dataflow that adapts to different GCN configurations to achieve optimal efficiency. We further provide two hardware-based techniques to address the workload imbalance problem caused by the unbalanced distribution of zeros in GCNs. Specifically, SGCNAX exploits an outer-product-based computation architecture that mitigates the intra-PE (Processing Elements) workload imbalance, and employs a group-and-shuffle approach to mitigate the inter-PE workload imbalance.

12 Claims, 9 Drawing Sheets

(56) References Cited

U.S. PATENT DOCUMENTS

| | | | | |
|---|---|---|---|---|
| 2018/0189234 A1* | 7/2018 | Nurvitadhi | ............. | G06F 17/16 |
| 2019/0042542 A1* | 2/2019 | Narayanamoorthy | .. | G06F 9/383 |
| 2022/0035890 A1* | 2/2022 | Liu | ....................... | G06F 7/5443 |

OTHER PUBLICATIONS

J. Li, A. Louri, A. Karanth, and R. Bunescu, "GCNAX: A flexible and energy-efficient accelerator for graph convolutional neural networks," in Proc. IEEE Int. Symp. High-Perform. Comput. Archit., pp. 775-788, 2021 (Year: 2021).*

T. Geng et al., "Awb-gcn: A graph convolutional network accelerator with runtime workload rebalancing," in 2020 53rd Annual IEEE/ACM International Symposium on Microarchitecture (MICRO), pp. 922-936, IEEE, 2020.

M. Yan et al., "Hygcn: A gcn accelerator with hybrid architecture," in 2020 IEEE International Symposium on High Performance Computer Architecture (HPCA), pp. 15-29, 2020.

D. Yang, et al., "Procrustes: a dataflow and accelerator for sparse deep neural network training," in 2020 53rd Annual IEEE/ACM Interna-tional Symposium on Microarchitecture (MICRO), pp. 711-724, IEEE, 2020.

Z. Zhang, et al., "Sparch: Efficient architecture for sparse matrix multiplication," in 2020 IEEE In-ternational Symposium on High Performance Computer Architecture (HPCA), pp. 261-274, IEEE, 2020.

A. Auten, et al., "Hardware acceleration of graph neural networks," in 2020 57th ACM/IEEE Design Automa-tion Conference (DAC), pp. 1-6, IEEE, 2020.

S. Liang et al., "Engn: A high-throughput and energy-efficient accelerator for large graph neural networks," IEEE Transactions on Computers, 2020.

* cited by examiner

200

201 A Multiply-and-accumulate array receives a non-zero scalar from Sparse Matrix Buffer and first associated position within a two-dimensional space

202 The Multiply-and-accumulate array receives a first row vector from Dense Matrix Buffer and second associated position of the first element in the row within a two-dimensional space

203 Within the Multiply-and-accumulate array, each of the element values in the first row vector multiplies with the non-zero scalar to produce a second row vector product

204 Combine the first associated position with the second associated position to product a third associated position

205 The Multiply-and-accumulate array receives a third row vector from Output Buffer according to the third associated position. Within the Multiply-and-accumulate array, add the second row vector and the third row vector to produce a fourth row vector

206 Store the fourth row vector into Output Buffer according to the third associated position

FIG. 4

SGCNAX: A SCALABLE GRAPH CONVOLUTIONAL NEURAL NETWORK ACCELERATOR WITH WORKLOAD BALANCING

CROSS-REFERENCE TO RELATED APPLICATIONS

This application claims the benefit of priority of U.S. Provisional Application Ser. No. 63/125,760 filed on Dec. 15, 2020, the content of which is relied upon and incorporated herein by reference in its entirety.

SPONSORED RESEARCH

This invention was made in part with Government support under Contract No. CCF-1702980 awarded by the National Science Foundation. The U.S. Government has certain rights in this invention.

FIELD

The disclosure relates generally to the field of graph convolutional neural network accelerator and more particularly to a scalable graph convolutional neural network accelerator with workload balancing.

BACKGROUND

Recently, deep learning over graph data has achieved great success in a broad range of applications, such as traffic prediction, object detection, disease classification, and many others. One of the most successful models is Graph Convolutional Neural Network (GCN) that re-defines the notion of convolution for graph data. This model has been widely used in a variety of data centers including Google, Alibaba, and Facebook.

Much like traditional neural networks, training and inference of GCNs are both compute- and memory-intensive but impose new requirements on designing the underlying hardware architecture. Specifically, the execution time for graph convolutional layers is mainly dominated by two primary phases: Aggregation and Combination. The computation in the combination phase is similar to that in conventional neural networks. However, the aggregation phase depends on the graph structure which is often sparse and irregular. The sparsity and irregularity would be the new challenges facing the physical design of GCN architectures.

The key computation function in GCNs can be abstracted as chain Sparse-dense Matrix Multiplications (SpMMs). It involves six nested loops that gives rise to a large design space for GCN accelerators in terms of parallelism, computation partitioning and scheduling. A number of loop optimization techniques, such as loop tiling, loop un-rolling, loop interchange, and loop fusion can be used for GCNs. Recently, a few customized GCN accelerators have leveraged these techniques to deliver gains in performance and energy efficiency. However, none of them has systematically studied the impact of these techniques on system efficiency in terms of latency and loop optimization techniques, or determine the design variables based on random sampling. As a result, they can hardly exploit data reuse efficiently, leading to increased memory accesses and performance loss.

SUMMARY

The present disclosure is for a SGCNAX, a scalable GCN accelerator architecture for high-performance and energy-efficient acceleration of GCNs. Specifically, the contributions include, but are not limited to, the following.

First, we provide an in-depth analysis of the four loop optimization techniques for GCN computation and use corresponding design variables to characterize the GCN dataflow. We then build analytical models to quantitatively estimate the design objectives of GCN dataflow, such as latency and the number of off-chip DRAM accesses. We found that for different GCN configurations, different design variables of the dataflow can be used to achieve improved efficiency. Therefore, we provide a flexible dataflow that can reconfigure the design variables to adapt to different GCN configurations.

Second, a hardware accelerator is provided, called SGCNAX (Scalable Graph Convolutional Neural network Accelerator) to support the flexible dataflow. We observe that existing accelerators incur performance losses because of the workload imbalance caused by the extremely sparse and unbalanced matrices in GCNs. Specifically, the existing accelerators suffer from two forms of workload imbalances. The first is intra-PE (Processing Element) workload imbalance when some Multiply-and-Accumulate (MAC) units are processing zeros while others are processing non-zeros, leading to the under-utilization of MAC units. The second is inter-PE workload imbalance, which stems from the way the dataflow partitions the work across the PEs. Since some PEs may complete the workload earlier as they are allocated sparser workloads, they have to sit idle while waiting for the laggards because of inter-PE synchronization.

The present SGCNAX tackles both imbalances by employing two novel hardware/software co-design techniques. Specifically, SGCNAX employs an outer-product-based computation architecture for SpMMs to mitigate the intra-PE workload imbalance. For the inter-PE workload imbalance, SGCNAX employs a group-and-shuffle computing approach, which groups the rows in a sparse matrix by density so that the row groups are similar in density, and then maps the rows within a group to the PEs so that all PEs complete the tasks simultaneously.

We implement the SGCNAX accelerator in RTL targeting TSMC 40 nm library. We also build a cycle-level simulator that models the microarchitectural behavior of each module while supporting different dataflows. Evaluated on five real-world graph datasets, SGCNAX performs 9.2×, 1.6× and 1.2× better, and reduces DRAM accesses by a factor of 9.7×, 2.9× and 1.2× compared to HyGCN (Hybrid architecture GCN accelerator), AWB-GCN (Autotuning Workload Balancing GCN), and GCNAX (Graph Convolutional Neural network Accelerator), respectively. GCNAX has a single PE, while SGCNAX employs multiple PEs.

We scale the accelerator to be equipped with an array of Processing Elements (PEs) to achieve improved performance. The accelerator employs a spatial tiling strategy to spread the GCN workload across the PEs. The accelerator further employs a group-and-shuffle approach to mitigate the inter-PE workload imbalance.

BRIEF DESCRIPTION OF THE FIGURES

FIG. 4 illustrates a flowchart of an example method of performing both combination and aggregation phases.

DETAILED DESCRIPTION

1 GCN Computation and GCN Accelerators

1.1 GCN Computation

Figure 1:
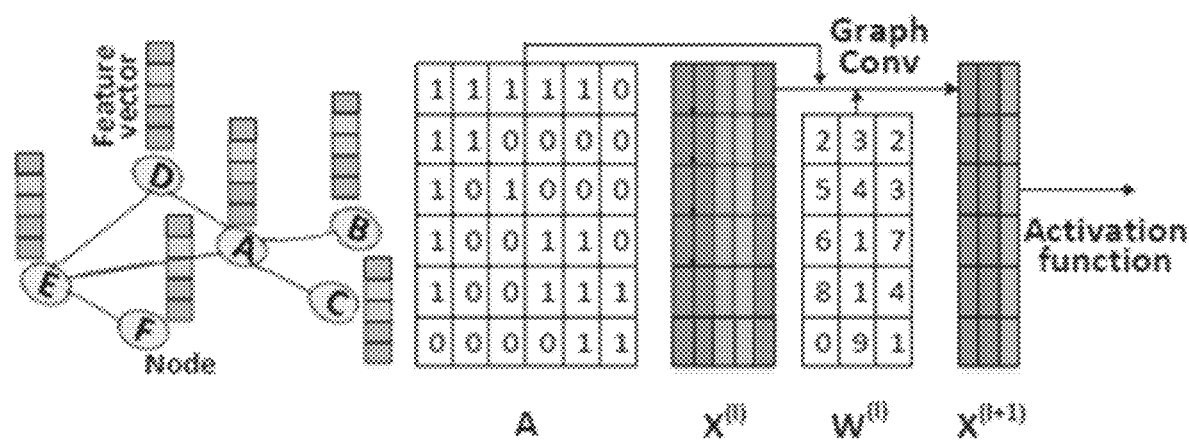
FIG. 1 illustrates a conventional GCN layer.

FIG. 1 illustrates a conventional GCN layer, where: (1) A is an adjacency matrix; (2) $X^{(l)}$ is feature matrix of layer l that includes feature vectors; (3) Wm is weight matrix of layer l; (4) $X^{(l+1)}$ is feature vectors of layer l+1. An example structure of a graph convolutional layer is illustrated in FIG. 1. The prevalent computation pattern of the GCN models can be abstracted as a chain SpMM:

$$X^{(k+1)} = \sigma(\hat{A}X^{(k)}W^{(k)}) \quad (1)$$

where $X^{(k)}$ is the matrix of input features in layer k; each column of $X^{(k)}$ represents a feature vector while each row denotes a node (here, six nodes are shown). $W^{(k)}$ is the weight matrix of layer k. $\sigma(\bullet)$ denotes the non-linear activation function such as ReLU. Â is a transformed matrix from the graph adjacency matrix. The transformation function varies across different GCN models. Since Â can be computed offline from A, we hereafter use A to denote the normalized Â. Table 1 lists the notations used in GCNs. GCN is a type of convolutional neural network that can work directly on graphs and take advantage of their structural information. It solves the problem of classifying nodes (such as documents) in a graph (such as a citation network), where labels are only available for a small subset of nodes (semi-supervised learning).

TABLE 1

Notations in GCNs.

| Term | Meaning |
|---|---|
| G | graph G = (V, E) |
| V | vertices of G |
| E | edges of G |
| $D_v$ | degree of vertex v |
| $e_{(i,j)}$ | edge between vertex i and j |
| N(v)(S(v)) | (sampling subset of) neighbor set of v |
| $A(A_{ij})$ | (element of) adjacency matrix |
| $a_v$ | aggregation feature vector of v |
| $h_v$ | feature vector of v |
| b | combination bias vectors |
| X | feature matrix composed by feature vectors |

The key computation pattern in GCNs is chain sparse matrix dense matrix multiplication (chain SpMM): O=A·X·W. A is called adjacency matrix, X is called input feature matrix, W is called weight matrix, O is output feature matrix. A and X are sparse, W is dense. The order of chain SpMM: first X multiplies W, then A multiplies the result matrix. B=X·W (Combination), O=A·B (Aggregation). For simplicity, we call matrix B as intermediate matrix, An example chain SpMM in GCNs can have six loops in the pseudo-code, as shown below. We assume that $A \in \mathbb{R}^{M \times N}$, $X \in \mathbb{R}^{N \times K}$, $W \in \mathbb{R}^{K \times G}$. Matrix $B \in \mathbb{R}^{N \times C}$ is the intermediate result of X×W and $O \in \mathbb{R}^{M \times C}$ is the final output matrix. We assume that we use the execution order of A×(X×W) as it reduces the number of computations for most graph datasets.

Example pseudo code of the chain SpMM in GCNs.

```
//SpMM1:B=XW
    for(n=0; n<N; n++) {  → Loop-1
        for(c=0; c<C; c++) {  → Loop-2
            for(k=0; k<K; k++) {  → Loop-3
                B[n][c]+=X[n][k]*W[k][c];
}}}
//SpMM2:O=AB
    for(m=0; m<M; m++) {  → Loop-4
        for(c=0; c<C; c++) {  → Loop-5
            for(n=0; n<N; n++) {  → Loop-6
                O[m][c]+=A[m][n]*B[n][c];
}}}
```

1.2 GCN Accelerators

Recently, a few GCN accelerators have been provided, which provide improvements in performance and energy efficiency compared to generic CPU- and GPU-based solutions. Specifically, HyGCN exploits two dedicated compute engines, i.e., an aggregation engine and a combination engine, to accelerate the Aggregation and Combination phases, respectively. AWB-GCN is an architecture for accelerating GCNs and Sparse-dense Matrix Multiplication (SpMM) kernels, and addresses the issue of workload imbalance in processing real-world graphs. GCNAX provides a flexible dataflow for GCNs that simultaneously improves resource utilization and reduces data movement.

These accelerators can have an accelerator chip and off-chip memory, which is usually dynamic random-access memory (DRAM). The accelerator chip has a Processing Unit (PU), a global buffer (GLB), and a Scheduler. The PU can support high compute parallelism for matrix multiplications, either having two separate engines (HyGCN) or having one uniform engine (AWB-GCN, GCNAX). The scheduler is used to map the GCNs onto the accelerator using the computation sequences defined by the loop optimization techniques. GLB is usually a uniform software-controlled SRAM scratchpad memory that can be used to exploit input data reuse and hide DRAM access latency, or to store intermediate data. The accelerator often has three levels of memory hierarchy, including DRAM, GLB, and local registers in PEs. The energy consumption for data access depends on the memory hierarchy.

In the present disclosure, we address (or reduce) the expensive off-chip DRAM accesses (between off-chip DRAM and GLB).

2 Sgcnax Architecture

2.1 Overview

Figure 2:
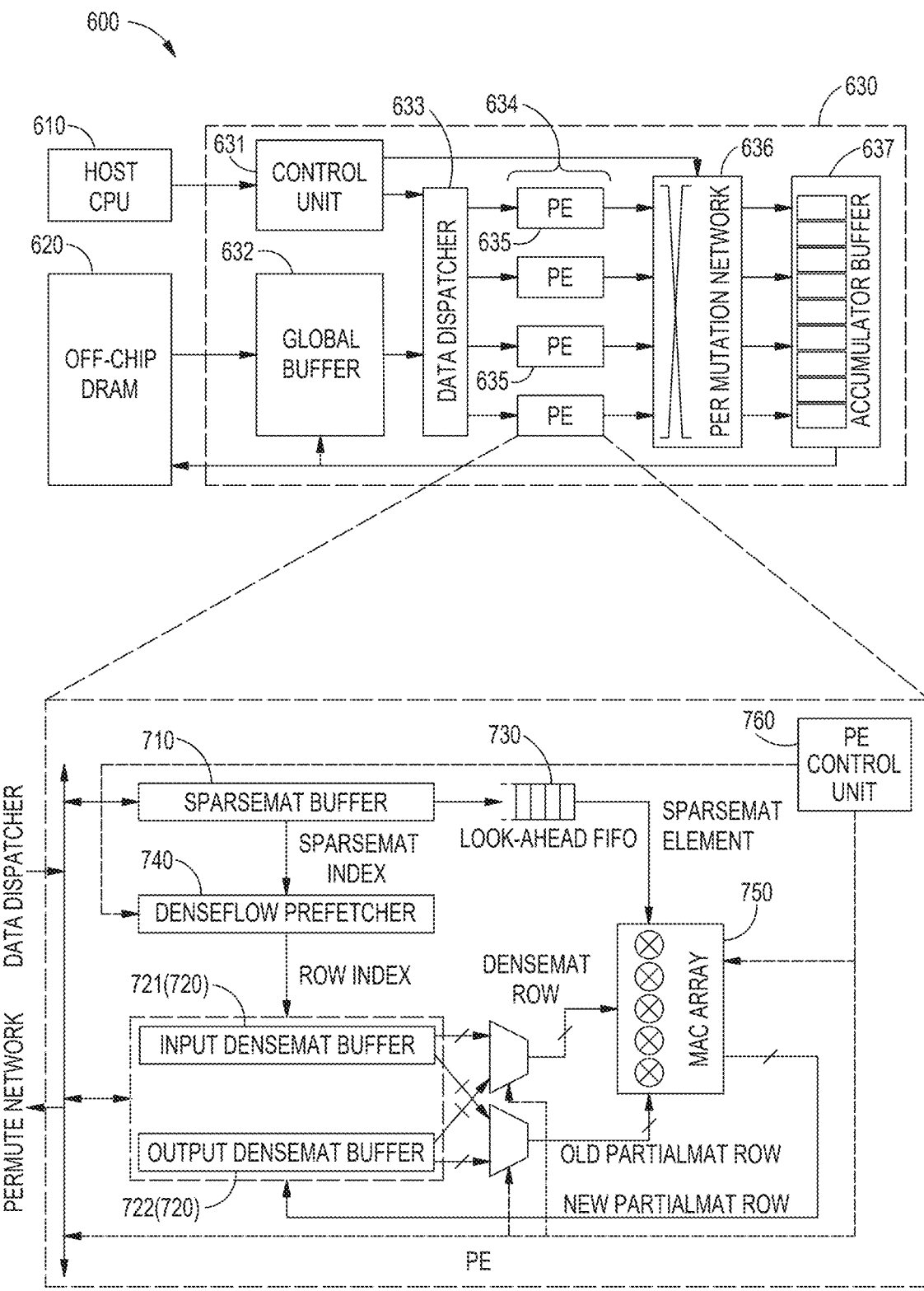
FIG. 2 illustrates an example structural diagram of an example accelerator (SGCNAX) according to disclosed examples.

We provide an accelerator architecture, called SGCNAX architecture, to support the flexible dataflow. FIG. 2 illustrates an example architecture (or structure) of an example accelerator (SGCNAX) 600. The accelerator (SGCNAX) 600 includes a host central processing unit (CPU) 610, an off-chip dynamic random-access memory (DRAM) 620, and an accelerator chip 630 (e.g., accelerator circuit). The accelerator chip 630 includes a control unit (CU) 631 (e.g., a chip or circuit control unit), a global buffer (GLB) 632, a data dispatcher 633, a processing element (PE) array 634 that include processing elements (PEs) 635, a multi-stage permutation network 636, and an accumulator buffer 637.

The host CPU 610 may be, for example, a microprocessor used to configure or set tile size, loop order, and loop fusion strategy for different datasets, and to generate and send corresponding one or more commands to the control unit 631. The control unit 631 may be, for example, a microprocessor configured to control the reading of the memory (or memory data) from off-chip DRAM 620 to obtain adjacency matrix, feature matrix, and/or weight matrix. In the example of FIG. 2, the host CPU 610 and the off-chip DRAM 620 are external to the accelerator chip 630. In other examples, the CPU 610 can be included in the accelerator chip 630. The GLB 632 is inside the accelerator chip 630 and coupled to the data dispatcher 633 and the off-chip DRAM 620, and is used to exploit input data reuse and hide DRAM access latency, or for the storage of intermediate data. The data dispatcher 633 is coupled to and is configured to distribute the input data to the PE array 634. In some examples, the off-chip DRAM 620 is configured to receive the input data for the accelerator (SGCNAX) 600; and the GLB 632 is configured to store (e.g., temporarily store) a partition of the input data before the input data being transmitted to the data dispatcher 633; the control unit 631 is configured to control the fetching of input data from the off-chip DRAM 620 to the GLB 632; the control unit 631 is further configured to control the data transmission from GLB 632 to data dispatcher 633; and the data dispatcher 633 is configured to distribute the input data to the PE array 634 (e.g., under the control of the control unit 631). The permutation network 636 is coupled to the PE array 634 and is configured to collect (or receive) the outputs (e.g., output data) from the PE array 634 and sends them to the accumulator buffer 637 for accumulation, e.g., under the control of the control unit 631. The accumulator buffer 637 is coupled to the permutation network 636, the GLB 632, and the off-chip DRAM 620. The data dispatcher 633 and permutation network 637 work (or operate) collaboratively to mitigate inter-PE workload imbalance.

2.2 PE Architecture

FIG. 2 also illustrates structural diagram of an example PE 635. The PE 635 includes a SparseMat Buffer (SMB) 710 (also referred to as "sparse matrix buffer"), Input/Output DenseMat Buffers 720 (IDMB 721/ODMB 722), a look-ahead first-in-first-out or first-input-first-output component (FIFO component) that is a hardware component configured for data storage, a DenseRow Prefetcher (DRP) 740, a multiply-and-accumulate (MAC) array 750, and a PE control unit 760. IDMB 721 can also be referred to as "input dense matrix buffer," and ODMB 722 can also be referred to as "output dense matrix buffer." The PE 635 can process both combination phase and aggregation phase. The MAC Array 750 includes a plurality of MAC units, and a MAC unit may be a hardware unit configured to perform multiplication and accumulation. The PE control unit 760 may be, for example, a microprocessor configured to control the reading of data from IDMB 721, ODMB 722, SMB 710 to MAC array 750. The PE control unit 760 may be further configured to control the writing of data from MAC array 750 to IDMB 721, and/or ODMB 722.

To process the SpMM, a portion of the sparse matrix may be fetched from DRAM 620 into SMB 710 in CSC format by via direct memory access (DMA), e.g., through GLB 632 and data dispatcher 633. Direct memory access (DMA) is a method that allows an input/output (I/O) device to send or receive data directly to or from the main memory, bypassing the CPU to speed up memory operations. Further, a portion of the input matrix may be fetched from DRAM 620 into IDMB 721 in dense format via DMA, e.g., through GLB 632 and data dispatcher 633. A portion of the output matrix may be fetched from DRAM 620 into ODMB 722 in dense format via DMA, e.g., through GLB 632 and data dispatcher 633, because the PE array 634 generates a partial product of output matrix, which is to be accumulated to the old values of the output matrix. First, an element value from SMB 710 is sent to the FIFO 730 (e.g., under the control of the PE control unit 760), while its row index in the CSC format is sent to DRP 740 (e.g., under the control of the PE control unit 760). Meanwhile, an old PartialMat row is fetched from ODMB 722 to the MAC array 750 waiting for accumulation. Then, the DRP 740 fetches the corresponding input DenseMat row from IDMB 721 according to the received index and the row index of the old PartialMat row. Since the required input DenseMat row is not known until receiving the index of the SparseMat element, there is a latency between the arriving time of the SparseMat element and the input DenseMat row to the MAC Array 750. The look-ahead FIFO 730 is used to hide this latency. Instead of directly sending the SparseMat element to MAC Array 750, it is sent to the FIFO 730. At the same time, the DRP 740 calculates the required row index and prefetches rows to MAC Array 750. The MAC Array 750 then conduct the outer product between the SparseMat element and the DenseMat row and the generated row is to be accumulated with the Old PartialMat row.

Partitioning and scheduling of GCN onto the processing element can be performed. A GCN workload is large. In some examples, host CPU 610 is configured to partition the workload into sub-workloads, and host CPU 610 is configured to schedule them to the PE 635. The processing order of these tasks is important because it determines the data access patterns, which impacts processing speed and energy consumption. We provide an adaptive scheduling strategy to minimize data accesses. When possible or in some examples, the PartialMat row is held consistently in the MAC Array 750 until its related computations are finished. Upon completion of the current PartialMat row, the generated new PartialMat row is then flushed to ODMB 722, and it proceeds to the next PartialMat row according to the execution order defined by the dataflow. When the output DenseMat can serve as the input DenseMat for the following SpMM, which is the case when we enable loop fusion, the IDMB 721 and ODMB 722 are logically swapped to the two SpMMs' computation sequence.

Figure 3:
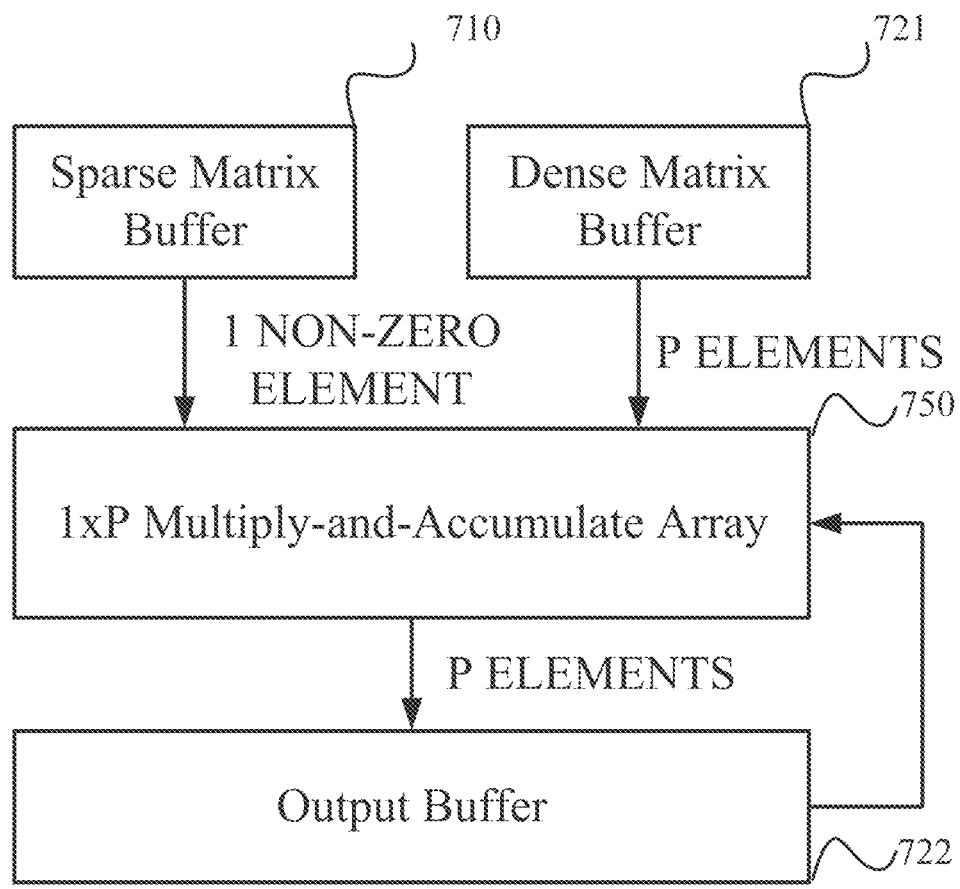
FIG. 3 illustrates another example structural diagram of an example PE according to another example.

FIG. 3 illustrates another example structural diagram of an example PE 635. Here, the PE 635 includes an SMB 710, IDMB 721, a MAC array 750, and ODMB 722. FIG. 4 illustrates a flowchart of an example method 200 of performing both combination and aggregation phases using a PE of a SGCNAX.

Referring to FIGS. 3 and 4, at step 201, the MAC array 750 receives a non-zero scalar from SMB 710 and first associated position within a two-dimensional space. At 202, the MAC array 750 receives a first row vector from the IDMB 721 and second associated position of the first element in the row within a two-dimensional space, where the number of elements in the first row vector may be P in the example of FIG. 2. At 203, within, the MAC array 750 multiplies each of the element values in the first row vector with the non-zero scalar to produce a second row vector product. The MAC array 750 perform the multiplication of each of the element values in the first row vector with the non-zero scalar to produce a second row vector, which is an outer-product based method.. At 204, the PE control unit 760 combines the first associated position with the second associated position to produce or generate a third associated position. At 205, the MAC array 750 receives a third row vector from ODMB 722 according to the third associated position. Within the MAC array 750, the MAC array 750 adds the second row vector to the third row vector to produce a fourth row vector. At 206, the MAC array 750 store the fourth row vector into ODMB 722 according to the third associated position.

Using the example method 200 (such as steps 201 to 206), PE 635 can perform both the combination phase and the aggregation phase. Because matrixes (such as matrix X, W, B, 0) may be too large to fit into the MAC array 750, they can be processed in portions or parts, and partial products can be added or accumulated to generate respective final result.

In some examples of processing the combination phase, the first row vector is a row vector of weight matrix W, which is a portion of weight matrix W; and the second row vector is a row vector of intermediate matrix B, which is a partial product (e.g., a partial result) for intermediate matrix B; the third row vector is a row vector of intermediate matrix B, which is another partial product (e.g., an old partial product) for intermediate matrix B. The MAC array 750 can add the second row vector to the third row vector, so as to produce the fourth row vector of intermediate matrix B (see Step 205), which can be a new partial product for intermediate matrix B. Such process can be repeated, such that partial products for intermediate matrix B each are added or accumulated, and the final result for intermediate matrix B is generated by the MAC array 750.

In certain examples of processing the aggregation phase, the first row vector is a row vector of intermediate matrix B, which is a portion of weight matrix B; and the second row vector is a row vector of the output matrix O, which is a partial product (or a partial result) for the output matrix O; the third row vector is a row vector of the output matrix O, which is another partial product (e.g., an old partial product) for the output matrix O. The MAC array 750 can add the second row vector to the third row vector, so as to produce the fourth row vector of the output matrix O (see Step 205), which can be a new partial product for the output matrix O. Such process can be repeated, such that partial products for the output matrix O each are added or accumulated, and the final result for the output matrix O is generated by the MAC array 750.

In the example of the PE processing the combination phase, the SMB 710 stores a block of input feature matrix X, and the non-zero scalar is a scalar of (or from) the block of input feature matrix X, the IDMB 721 stores a block of the weight matrix W. In the example of the PE processing the aggregation phase, the SMB 710 stores a block of adjacency matrix A, and the non-zero scalar is a scalar of (or from) the block of adjacency matrix A, and the IDMB 721 stores a block of the intermediate matrix B.

3 Gcn Dataflow

A GCN's dataflow defines how the loops are ordered, partitioned, and parallelized. That being said, the chain SpMMs can be manipulated (e.g., ordered and partitioned) to capture different data reuse opportunities. What we investigate includes four loop optimization techniques, namely loop unrolling, loop tiling, loop interchange, and loop fusion, to improve GCN's dataflow.

3.1 Loop Optimization Techniques

3.1.1 Loop Unrolling

Figure 5A:
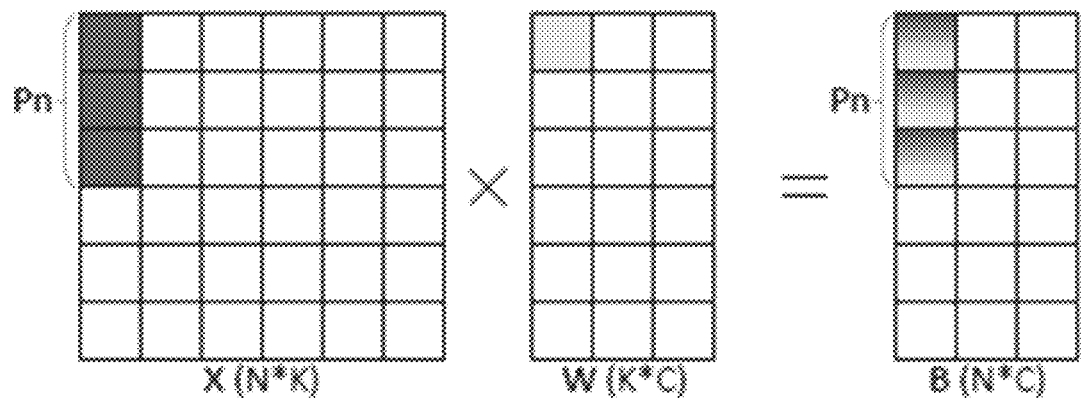
FIGS. 5A, 5B, and 5C illustrate examples of loop unrolling.
Figure 5B:
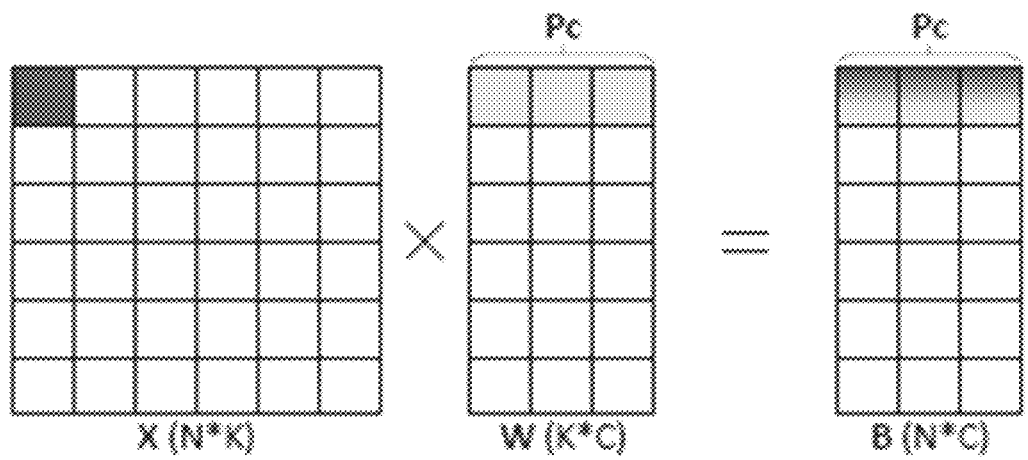
Figure 5C:
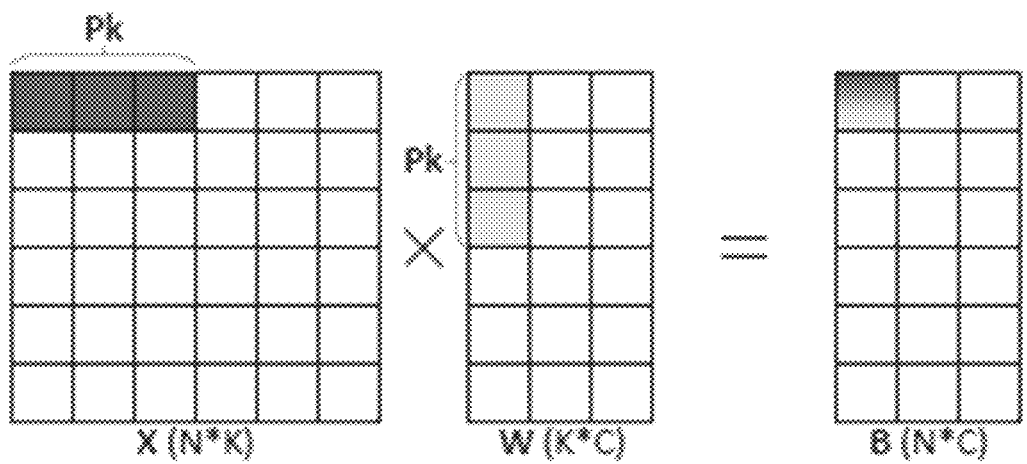

Loop unrolling determines the parallelization strategy of the GCN loops, which determines the PE array scale and organization as well as the size of registers in each PE. It can be used to increase the utilization of massive computation resources. Researchers have extensively studied the methods to unroll SpMM for parallel computations. FIGS. 5A, 5B, and 5C illustrate examples of loop unrolling. As illustrated in FIGS. 5A, 5B, and 5C, which takes SpMM1 as an example, unrolling different loops directs parallelization of different computations, which affects the optimal PE array architecture with respect to the data reuse opportunities and memory access patterns.

Loop-1 unrolled (FIG. 5A): in this case, a column vector of Pn pixels from X is multiplied with a pixel from W in each cycle, and generates a column vector of Pn pixels which are accumulated to matrix B, which is an outer-product based method. If data reuse in local registers is not enabled, in each cycle, it takes Pn SRAM reads to fetch a column vector of Pn pixels from X, it takes 1 SRAM read to fetch a pixel from W, it takes Pn SRAM reads to fetch old partial product of size Pn from B, and it takes Pn SRAM writes to store new partial product of size Pn. Accordingly, it can involve 2×Pn+1 SRAM reads and Pn SRAM writes in each cycle. The SRAM may be, for example, a part of PE 635, and may include, for example, SMB 710, IDMB 721, and/or ODMB 722 of the PE 635.

Loop-2 unrolled (FIG. 5B): in this case, a row vector of Pc pixels from W is multiplied with a pixel from X in each cycle, and generates a row vector of Pc pixels which are accumulated to matrix B. If data reuse in local registers is not enabled, it takes Pc SRAM reads to fetch a row vector of Pc pixels from W, it takes 1 SRAM read to fetch a pixel from X, it takes Pc SRAM reads to fetch old partial product of size Pc from B, and it takes Pc SRAM writes to store new partial product of size Pc. Accordingly, it can involve 2×Pc+1 SRAM reads and Pc SRAM writes in each cycle. This unrolling is also called outer-product method or outer-product based method.

Loop-3 unrolled (FIG. 5C): in this case, the inner product of a row vector of Pk pixels from X and a column vector of the same size from W is computed in each cycle, and generates one pixel which is accumulated to matrix B. If data reuse in local registers is not enabled, it takes Pk SRAM reads to fetch a row vector of Pk from X, it takes Pk SRAM reads to fetch a column vector of Pk pixels from W; it takes one SRAM read to fetch old partial product of size one from B; and it takes one SRAM write to store new partial product of size one. Accordingly, it can involve 2× Pk+1 SRAM reads and 1 SRAM write in each cycle. This unrolling is also called inner-product method.

These unrolling factors (Pn, Pk, Pc) can determine the total number of parallel MAC operations as well as the number of required multipliers.

3.1.2 Loop Tiling

Loop tiling can be applied for each SpMM to leverage data locality, and it determines the required capacity and the partitioning of GLB. As the on-chip GLB capacity is usually not large enough to hold all the data in GCNs, loop tiling can be used to divide the entire data and only fit a small portion of the data into the on-chip GLB. By properly selecting the loop tile size, the data reuse can be maximized to reduce off-chip DRAM access. This will significantly improve the overall energy efficiency, as the energy cost of off-chip memory accesses is orders of magnitude higher than that of arithmetic operations. The tile size sets the lower bound of the required GLB capacity. In other words, the GLB should be sized large enough to hold the data tiles.

3.1.3 Loop Interchange

Loop interchange determines the computation order of the loops, and it can be used to enable different types of data reuse to reduce external memory traffic by exchanging the order of the nested loops. There are two types of loop interchange in the GCN loops, namely intra-tiling and inter-tiling loop orders. Intra-tiling loop order determines the pattern of data movements from on-chip GLB to register files. Inter-tiling loop order determines the data movement from external memory to on-chip GLB. Loop interchange along with local memory promotion can reduce the data movements. Specifically, if the innermost loop is irrelevant to a matrix, i.e., the loop iterator does not appear in the access function of the matrix, there are redundant memory operations between different loop iterations which can be eliminated to reduce memory access operations.

3.1.4 Loop Fusion

Loop fusion optimization (or improvement) can be leveraged to reduce data transfer of intermediate data. Specifically, we can fuse the processing of SpMM1 and SpMM2 to reduce the data transfer of matrix B between off-chip DRAM and on-chip GLB. If the two SpMMs are executed sequentially without fusion, the elements of matrix B are stored back to DRAM in SpMM1, and they are again fetched from DRAM to on-chip in SpMM2. Therefore, we can reduce the data transfer of these intermediate data by fusing the execution of SpMM1 and SpMM2. When SpMM1 finishes the computation of loop k and generates a B chunk, we can pause the execution of SpMM1 and proceed to the execution of SpMM2. By doing so, the data transfer of the intermediate matrix (B) is eliminated. Notably, although loop fusion reduces data transfer of intermediate results, it somehow sacrifices the freedom of loop interchange. Specifically, iteration k in SpMM1 must be the innermost loop to ensure that matrix B finishes all its computations (not a PartialMat) before being forwarded to SpMM2. Moreover, as m becomes the innermost loop in the communication part of SpMM2, matrix O has to be frequently transferred between on-chip and off-chip. Since O is the result matrix, the volume of data transfer is doubled compared to the input matrix such as matrix A because the result matrix has to be written back to the main memory when being replaced, whereas the input matrix can be directly replaced without being written back. Table 2 lists the parameters in GCNs and the design variables used by the four loop optimization (or improvement) techniques, where variables with a prefix of capital T denotes the tile size, and P for unrolling factors. Since both SpMM1 and SpMM2 contain the loop n and c, we hereafter use n0, c0 as the loop iterator in SpMM1, and n1, c1 as the loop iterator in SpMM2.

3.2 Flexible GCN Dataflow

Although we have concluded the key design factors of GCN dataflow, it is not easy to decide which combination of design variables is optimal (or to be chosen) for a given GCN layer. Simply using static design variables by random sampling for all layers as many prior works did is far from optimal due to the dimension and sparsity variance across different layers. Therefore, in this subsection, we introduce how to determine the design variables for a given graph convolutional layer. We first formulate the selection of design variables, e.g., as an optimization problem (or as an improvement problem), which aims at finding the best combination of design variables that maximizes the design objectives (e.g., minimizing the number of off-chip DRAM accesses and latency) under certain design constraints (e.g., on-chip storage size and the number of multipliers). We found that it is a non-deterministic polynomial-time hardness (NP-hard) problem because of the large design space, thus requiring heuristic solutions in practice. Therefore, we provide a greedy search algorithm to address this problem.

Figure 6:
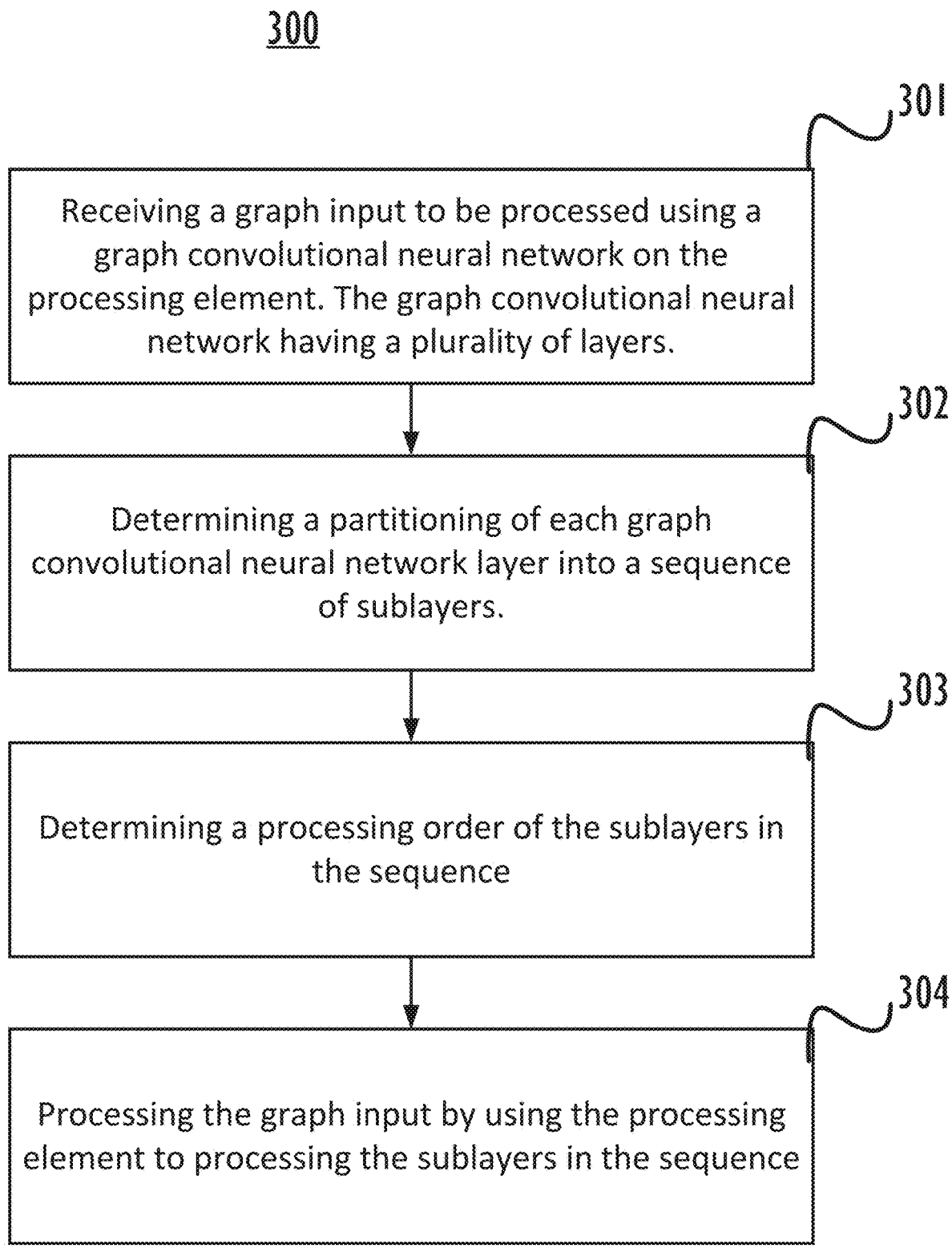
FIG. 6 illustrates a flowchart of an example method of scheduling of graph convolutional neural network onto a processing element.

FIG. 6 illustrates a flowchart of an example method 300 of scheduling of graph convolutional neural network onto a processing element, such as PE 635 (FIG. 2). The method 300 can be, for example, applied for intra-PE scheduling. At 301, the host CPU 610 receives a graph input to be processed using a graph convolutional neural network on the processing element. A graph convolutional neural network may be the workload the accelerator (such as accelerator 600) can process. The graph convolutional neural network may have a plurality of layers, e.g., defined by the users. At 302, the host CPU 610 determines a partitioning of each graph convolutional neural network layer into a sequence of sublayers. At 303, the host CPU 610 determines a processing order of the sublayers in the sequence. At 304, the processing element 635 processes the graph input by processing the sublayers in the sequence, e.g., according to the determined processing order of the sublayers.

3.2.1 Design Objectives and Greedy Search

We are primarily targeting substantial improvements for the following three design objectives: computation latency which depends on the loop un-rolling factors and the sparsity of data; the number of off-chip DRAM accesses which primarily relies on the size of GLB and the degree of data reuse, where these latter are determined by the tile size, inter-tiling loop order, and loop fusion strategy; and/or the number of on-chip SRAM accesses, which is determined by the loop unrolling strategies and intra-tiling loop order, since they determine the reuse patterns of the data transfer from GLB to local registers.

To simultaneously achieve all the design objectives might be infeasible as the best combination of design variables for off-chip DRAM accesses may not be optimal for on-chip SRAM accesses, and vice versa. Therefore, to optimize (or

TABLE 2

GCN loop parameters and design variables

| | | SpMM1 (B = XW) | | | | SpMM2 (O = AB) | |
|---|---|---|---|---|---|---|---|
| GCN Loops | | Loop-1 | Loop-2 | Loop-3 | Loop-4 | Loop-5 | Loop-6 |
| Dimensions | | N | C | K | M | C | N |
| Without Loop Fusion | Loop Tiling | Tn0 | Tc0 | Tk | Tm | Tc1 | Tn1 |
| | Loop Unrolling | Pn0 | Pc0 | Pk | Pm | Pc1 | Pn1 |
| With Loop Fusion | Loop Tiling | Tn0 | Tc0 | Tk | Tm | —(equal to Tc0) | —(equal to Tn0) |
| | Loop Unrolling | Pn0 | Pc0 | Pk | Pm | Pc1 | Pn1 | to improve) the overall efficiency, we combine the three design objectives into one by calculating their weighted total as follows:

$$\text{Minimize } J = L(X^u) + \omega_1 \cdot V_d(X^t, X^{oo}, X^f) + \omega_2 \cdot V_s(X^u, X^{oi}) \quad (2)$$

$$\text{s.t.} \quad 0 < T_m \leq M, \ 0 < T_k \leq K$$

$$0 < T_{n0} \leq N, \ 0 < T_{n1} \leq N$$

$$0 < T_{c0} \leq C, \ 0 < T_{c1} \leq C$$

$$S_X + S_W + S_{B1} <= GLBsize$$

$$S_A + S_O + S_{B2} <= GLBsize$$

$$P_{n0} \times P_{c0} \times P_k \leq \#PEs$$

$$P_{n1} \times P_{c1} \times P_k \leq \#PEs$$

where $\mathbb{X} = \mathcal{X}^t \cup \mathcal{X}^{oo} \cup \mathcal{X}^j \cup \mathcal{X}^u \cup \mathcal{X}^{oi}$ denotes the entire search space, and $\mathcal{X}^t$, $\mathcal{X}^{oo}$, $\mathcal{X}^f$, $\mathcal{X}^u$, $\mathcal{X}^{oi}$ denote the parameter spaces of tile size, inter-tiling loop order, loop fusion strategy, unrolling factors, and intra-tiling loop order, respectively. L, $V_d$ and $V_s$ denote the computation latency, the number of off-chip DRAM accesses and on-chip SRAM accesses, respectively. $S_X$, $S_W$, $S_{B1}$, $S_A$, $S_O$, $S_{B2}$ denote the required on-chip storage size of the corresponding matrices, which are determined by the tile size. $\omega_1$ and $\omega_2$ are adjustment parameters that reflect the difference in the energy cost between basic arithmetic operation, DRAM access and SRAM access. In some examples, we set ω1=206.5, ω2=1.6 indicating a basic DRAM access operation and SRAM access consumes 206.5× and 1.6× more energy than a basic arithmetic operation does.

To solve or address this optimization problem, we first measure L, Vd, and Vs, given a combination of design variables and a GCN layer. We use the analytical models to estimate these numbers. Then, we need to find out which combination of design variables can minimize (or reduce) the design objective described in Equation (2). However, this may take substantial time to explore all the potential design variables finding the optimal solution due to the large design space. According to our experiments, the exhaustive search process takes tens of hours to fully explore the entire design space on an Intel I7-8650U@1.90 GHz processor, which is infeasible for practical use. Therefore, it requires heuristic solutions in practice.

To simplify the search, PE 635 can be configured to use outer-product-based computation architecture as shown in FIG. 5(B). This method provides additional input matrix reuse compared to the inner-product-based method. More importantly, it well supports the elimination of zero computations and avoids the intra-PE workload imbalance problem. In the examples of using outer-product method, the PE 635 performs the multiplication of a scalar with a row vector in each cycle. If the scalar is zero, all the multiplications in this cycle can be skipped. In contrast, if an inner-product based method is used, the PE 635 may perform dot product of two row vectors, and even though some elements in the row vectors are zeros, this cycle cannot be skipped as some other elements are non-zeros. We store the sparse matrix in Compressed Sparse Column (CSC) format, while the input DenseMat is stored in dense format in row-major order.

Since the input pixel from X is the input operand for all the Pc0 multiplications, these computations can be skipped simultaneously if the input pixel is zero.

For the design variables in loop interchange, loop tiling, and loop fusion, we provide a greedy search algorithm that can reduce the search time to several seconds. Table 3 shows how to determine the design variables for off-chip DRAM accesses ($\chi^t$, $\chi^{oo}$, $\chi^f$), which can be performed, for example, by profile 410 of FIG. 7 that is a sub-component of (or a part of) HOST CPU 610. This greedy algorithm leverages the empirical rules concluded from many simulation results.

TABLE 3

The greedy search algorithm to determine the design variables

| Conditions | Loop Fusion | Inter-tiling Loop Order | Tile Size Setting Priority |
|---|---|---|---|
| N · C ≥ $GLB_{size}$ | No | $n_0 \to c_0 \to k,$ <br> $m \to c_1 \to n_1$ | ① $T_{n0}$, Tm <br> ② $T_{c0}$, $T_{c1}$ <br> ③ $T_{n1}$, $T_k$ |
| N · C < $GLB_{size}$ | Yes | $n_0 \to c_0 \to k \to m$ | ① $T_{n0}$, $T_{n1}$ <br> ② $T_{c0}$, $T_{c1}$ <br> ③ $T_m$, $T_k$ |

The tile size setting priority indicates which tile size has the priority for larger number settings. For example, if N·C≥$GLB_{size}$, Tn0 and Tm have the highest priority for larger number settings, which means they will be set to the maximum number while satisfying other constraints. Tc0, Tc1 have the second-highest priority. When Tn0 and Tm are already set as the largest number, then Tc0, Tc1 will be set as large as possible. Furthermore, we discovered that the main reason for the large search space is that $\chi^t$ (the search space of tile size) contains every integer value between 1 to the dimension size. Therefore, pruning the search space $\chi^t$ can significantly shrink the entire search space. Most tile size values cannot be fully divided by the dimension size. In such cases, we need to pad the data block to simplify data movements, which will degrade the GLB space utilization. Clearly, the tile size that causes less padding will utilize the GLB space efficiently thus reducing unnecessary off-chip DRAM accesses. Among a set of tile size that results in the same number of iterations, the one requires minimum padding has the fewest data padding. Therefore, from 1 to dimension size, we only need to consider the smallest tile size values that yield a new number of loop iterations. For example, assume a value of 10 for dimension N, the candidate tile size will be {1,2,3,4,5,10} since they yield the number of loop iterations of (10,5,4,3,2,1). The number of points to sweep in dimension N will be reduced from O(N) to O(2√N). To better understand the greedy search, Table 4 presents the tile size, loop order and loop fusion choices for five datasets: Cora, CiteSeer, PubMed, Nell and Reddit when we constrain the GLB size at 128 KB.

TABLE 4

Design variables(tile size, inter-tiling loop order and loop fusion) derived from greedy search

| Dataset | Layer | (M-N-K-C) | $\gamma_A$ | $\gamma_X$ | Loop fusion | Inter-tiling Loop order | Tile Size Tuple $(T_{n0}, T_{n0}, T_k, T_{n1}, T_{n1}, T_m)$ |
|---|---|---|---|---|---|---|---|
| Cora | L1 | (2708-2708-1433-16) | 0.0018 | 0.0127 | Yes | $n_0 \to c_0 \to k \to m$ | (2708, 16, 1, 2708, 16, 1) |
| | L2 | (2708-2708-16-7) | 0.0018 | 0.78 | Yes | $n_0 \to c_0 \to k \to m$ | (2708, 7, 1, 2708, 7, 1) |
| Citeseer | L1 | (3327-3327-3703-16) | 0.0011 | 0.0085 | Yes | $n_0 \to c_0 \to k \to m$ | (3000, 16, 5, 3000, 16, 1) |
| | L2 | (3327-3327-16-6) | 0.0011 | 0.0085 | Yes | $n_0 \to c_0 \to k \to m$ | (3000, 6, 1, 3000, 6, 1) |
| Pubmed | L1 | (19717-19717-500-16) | 0.00028 | 0.1 | No | $n_0 \to c_0 \to k, m \to c_1 \to n_1$ | (3073, 16, 1, 1, 16, 3073) |
| | L2 | (19717-19717-16-3) | 0.00028 | 0.776 | No | $n_0 \to c_0 \to k, m \to c_1 \to n_1$ | (3000, 3, 1, 1025, 3, 3000) |
| Nell | L1 | (65755-65755-61278-64) | 0.000073 | 0.00011 | No | $n_0 \to c_0 \to k, m \to c_1 \to n_1$ | (4096, 1, 33, 1, 1, 4096) |
| | L2 | (65755-65755-64-186) | 0.000073 | 0.864 | No | $n_0 \to c_0 \to k, m \to c_1 \to n_1$ | (257, 186, 1, 1, 17, 2817) |
| Reddit | L1 | (232965-232965-602-64) | 0.0021 | 0.516 | No | $n_0 \to c_0 \to k, m \to c_1 \to n_1$ | (641, 64, 1, 1, 9, 4096) |
| | L2 | (232965-232965-64-41) | 0.0021 | 0.6 | No | $n_0 \to c_0 \to k, m \to c_1 \to n_1$ | (1153, 41, 1, 1, 17, 2817) |

Figure 7:
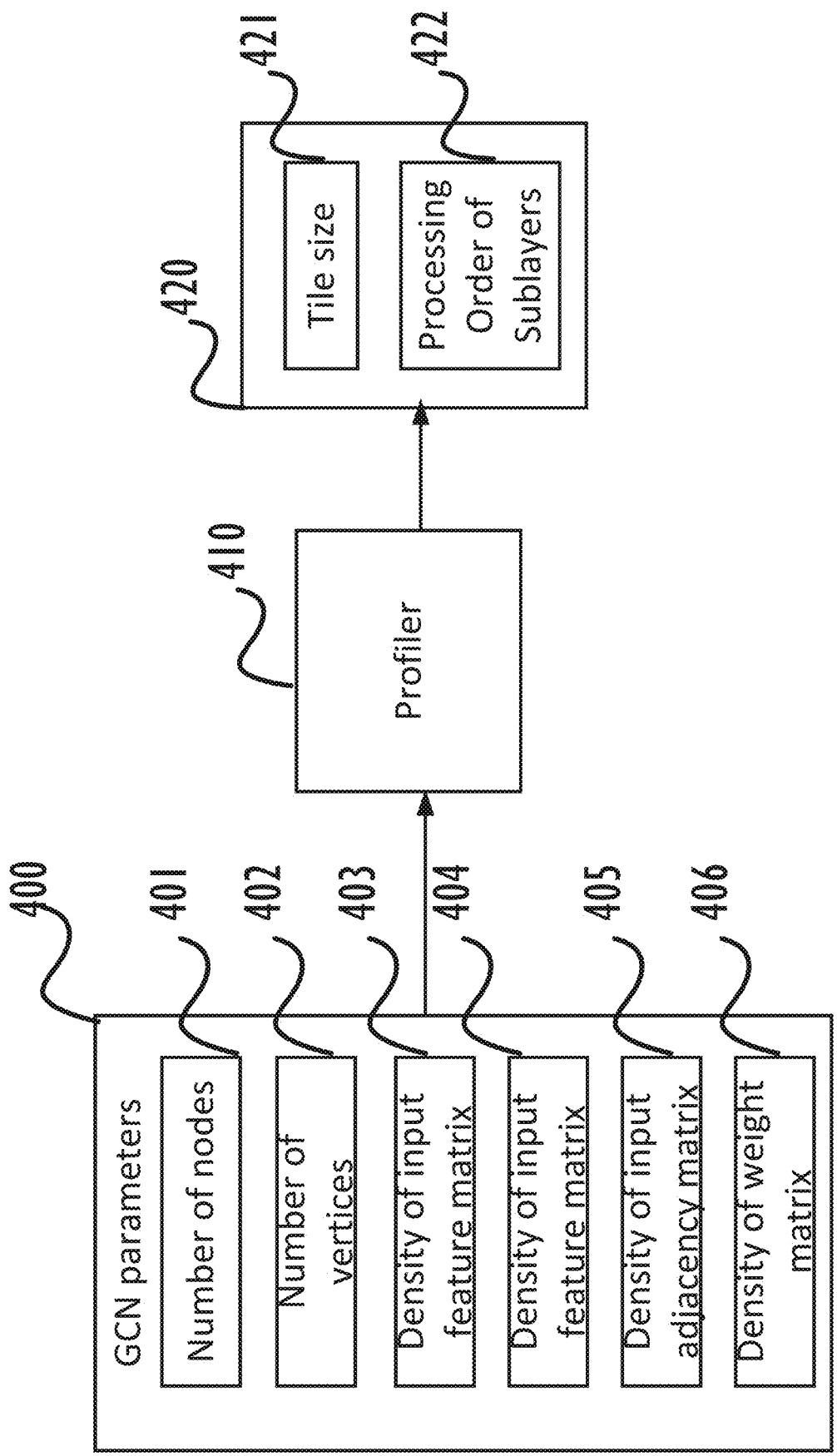
FIG. 7 illustrates example adaptive partitioning and scheduling of GCN onto the processing element according to one example.

FIG. 7 illustrates example adaptive partitioning and scheduling of GCN onto the processing element 635 according to one example, which can be, for example, applied for intra-PE scheduling. In the example of FIG. 7, GCN parameters 400 include number of nodes 401, number of vertices 402, density of input feature matrix 403, density of input feature matrix 404, density of input adjacency matrix 405, and/or density of weight matrix 406. GCNs may have different GCN parameters. Profiler 410 may be configured to determine, according to the GCN parameters 400 of a GCN, design variables 420 (such as tile size 421, processing order of sublayers) of the partitioning and scheduling of a GCN to the PE 635. Profiler 410 is a sub-component of (or apart of) HOST CPU 610. Refer to Table 3 and associated text for more details about how the profiler 410 determines the design variables.

4 Strategies of Sgcnax Architecture 4.1 Spatial Tiling Strategy

As we scaled the accelerator with multiple PEs 635 of a PE array 634 of GCNAX 600 (or in the architecture of GCNAX 600), the host CPU 610 uses or performs a spatial tiling strategy to spread the work across the PE array so that each PE can operate independently. There are many spatial tiling strategies, such as partitioning the adjacency matrix (A), feature matrix (X), or weight matrix (W) along the row and/or column dimension into smaller tiles and distributing them to the PEs. Different spatial tiling strategies lead to different computation and communication patterns. For example, if we partition matrix X along dimension n of matrix X in SpMM1 into smaller tiles, the PEs share the matrix W and the tiles of X are distributed to different PEs. By contrast, if we partition matrix W along dimension c of matrix W, the PEs share the matrix X and the tiles of W will be distributed to the PEs. For GCNs, considering that the dimension k and c are usually small, partitioning along these two dimensions may cause under-utilization of PEs because we may not have enough useful work to fully populate the PEs. Hence, we choose to partition the matrix X along the dimension n, and partition the matrix A along dimension m. Consequently, matrix W and matrix B are broadcast to the PEs, and each PE operates on its own subset of the computation task.

Figure 8:
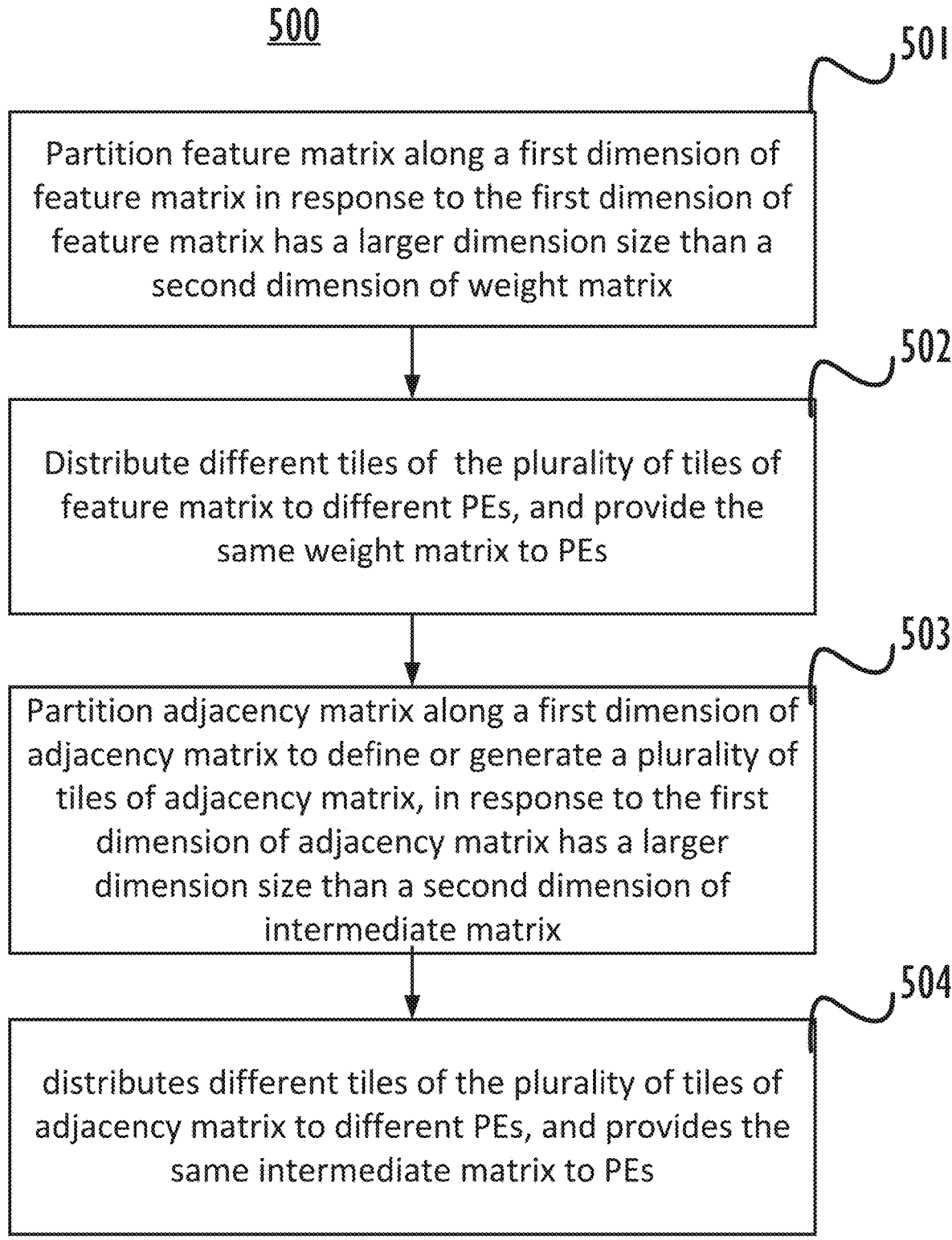
FIG. 8 illustrates a flowchart of an example method of performing spatial tiling strategy by partitioning.

FIG. 8 illustrates a flowchart of an example method of performing spatial tiling strategy by partitioning. At 501, the host CPU 610 partition feature matrix X along a first dimension (e.g., dimension n) of feature matrix X to define or generate a plurality of tiles of feature matrix X, in response to the first dimension (e.g., dimension n) of feature matrix X has a larger dimension size than a second dimension (e.g., dimension c) of weight matrix W. A dimension size of a dimension is the number of rows or columns along the dimension. The feature matrix X has the first dimension (e.g., dimension n) and a second dimension (e.g., dimension k), and weight matrix W has a first dimension (e.g., dimension k) and the second dimension (e.g., dimension c), and the second dimension of feature matrix X has a same dimension size as the first dimension of weight matrix W.

At 502, data dispatcher 633 distributes different tiles of the plurality of tiles of feature matrix X to different PEs, and provides the same weight matrix W to PEs. For example, some of the plurality tiles of feature matrix X are distributed to a first PE, and some other of the plurality tiles of feature matrix X are distributed to a second PE, and different PEs receive different tiles of feature matrix X; and the same weight matrix W are provided to each of the PEs. That is, the PEs share the same weight matrix W. Similar strategy can be applied when computing A·B.

At 503, the host CPU 610 partition adjacency matrix A along a first dimension (e.g., dimension m) of adjacency matrix A to define or generate a plurality of tiles of adjacency matrix A, in response to the first dimension (e.g., dimension m) of adjacency matrix A has a larger dimension size than a second dimension (e.g., dimension c) of intermediate matrix B. The adjacency matrix A has the first dimension (e.g., dimension m) and a second dimension (e.g., dimension n), and intermediate matrix B has a first dimension (e.g., dimension n) and the second dimension (e.g., dimension c), and the second dimension of adjacency matrix A has a same dimension size as the first dimension of intermediate matrix B, where intermediate matrix B is the result of feature matrix X multiplied by weight matrix W.

At 504, data dispatcher 633 distributes different tiles of the plurality of tiles of adjacency matrix A to different PEs, and provides the same intermediate matrix B to PEs.

4.2 Inter-PE Workload Balancing

Since the distribution of the non-zeros in the adjacency matrix and feature matrix is extremely unbalanced as the majority of non-zeros are in only a small set of rows/columns, it can lead to severe workload imbalance across the PEs and consequently a severe performance degradation. To this end, we employ a group-and-shuffle approach to mitigate this inter-PE workload imbalance, which groups the rows (or columns depending on the spatial strategy, we assume rows hereafter for simplicity) in a sparse matrix by density so that the row groups are similar in density, and then map the rows within a group to the PEs so that each PE will complete its workload almost simultaneously. That is, the differences between time (or cycles) taken by each PE to complete the respective workload can be reduced.

Figure 9A:
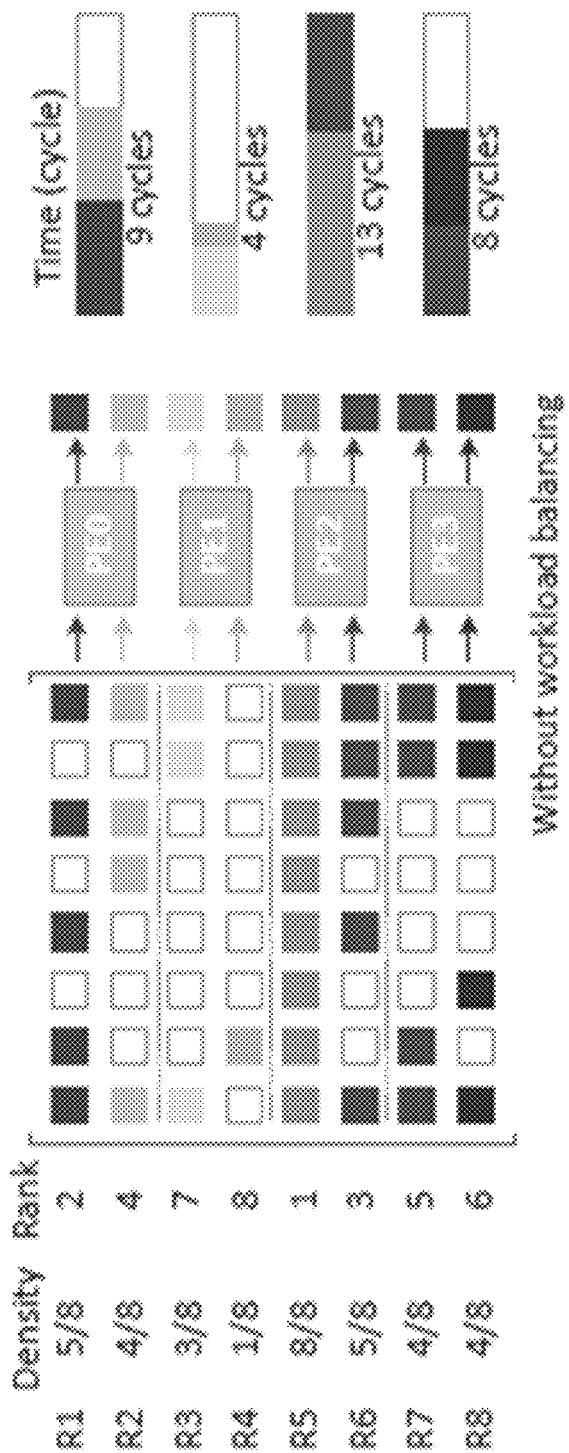
FIG. 9 (9A and 9B) illustrates an example of group-and-shuffle workload balancing mechanism.
Figure 9B:
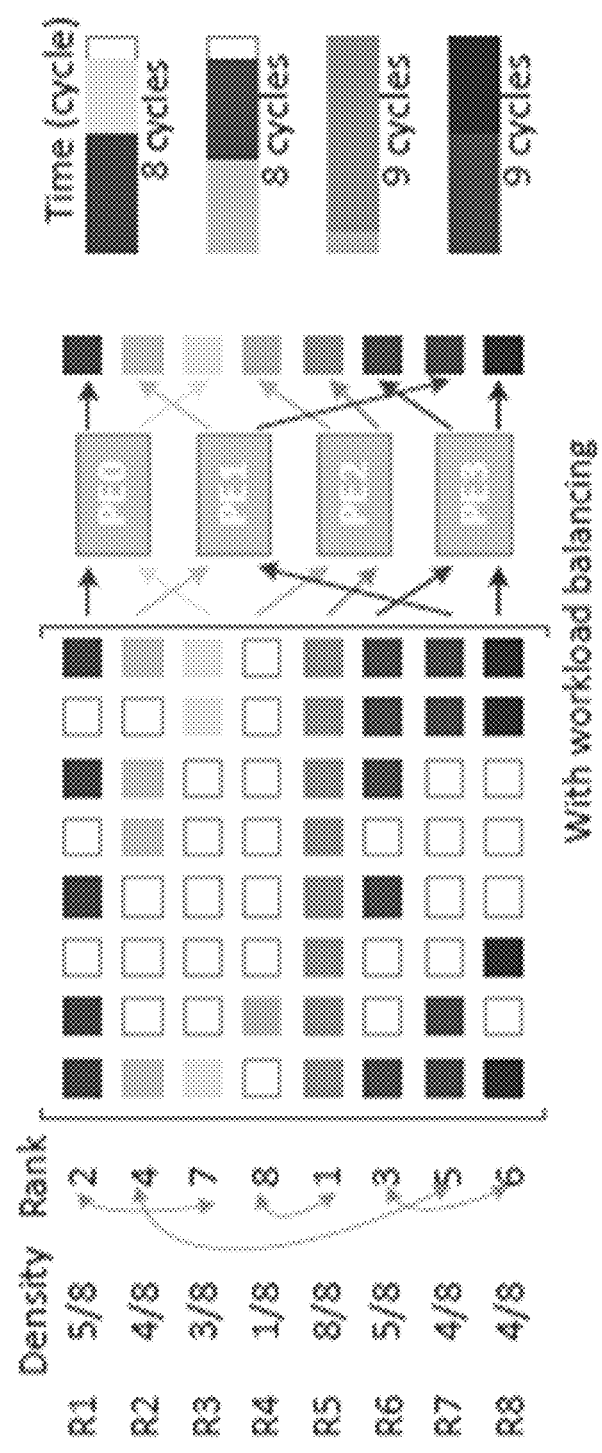

FIG. 9 (9A and 9B) illustrates an example of group-and-shuffle workload balancing mechanism, where FIGS. 9A and 9B correspond to scenarios without workload balancing and scenarios with workload balancing, respectively, for comparison purposes. The size of the sparse matrix is 8×8. We assume there are four PEs in total so each PE is allocated a 2×8 tile. The densities of each row, the density-sorted rank order of each row, and the utilization of the four PEs is also shown in the figure. When there is no workload balancing as shown in FIG. 6(a), the rows are distributed to the PEs by the row index (e.g., R1 and R2 to PE0, R3 and R4 to PE1). Since the row density varies, PEs with denser rows such as PE2 will take more cycles to complete the computation task, while the others have to idle because of PE synchronization.

To address this problem, in some examples (such as example of FIG. 9B), data dispatcher 633 first group the rows by the density-sorted rank order, e.g., the densest row (R5) and the sparsest row (R4) is in the same group, so that these row groups are similar in density (e.g., from 8/16 to 9/16). Thus, density differences between row groups can be reduced, e.g., to be less than certain value. Then data dispatcher 633 maps each row group to a PE so that each PE can complete the task almost simultaneously. That is, the differences between time (or cycles) taken by each PE to complete the respective task can be reduced. Since the grouping shuffles the output positions in the output matrix, permutation network 636 can "unshuffle" the outputs to recover the correct positions. That is, permutation network 636 can restore the outputs to the correct positions (or correct orders). In SGCNAX, the Data Dispatcher performs the sorting and grouping of the rows, and sends the "shuffle" information to the Control Unit. The Control Unit configures Permutation Network to "unshuffle" the outputs to the Accumulator Buffer.

Researchers have also proposed various techniques to address the load imbalance problem in sparse neural network accelerators. For example, Procrustes addresses the load imbalance across a 2D PE array by distributing the non-sparse minibatch dimension across one hardware dimension and the sparse tensor dimension across the other hardware dimension. However, it's dedicated to DNNs and might need some augmentation to work with GCNs, which can be our future work.

5 Experimental Methodology

Hardware Simulator. To evaluate the performance of our design, we built a cycle-level simulator in C++ to model the behavior of the hardware. The simulator models the microarchitectural behaviors of each module, and supports the dataflows with reconfigurable design variables. The simulator counts the exact amount of DRAM reads and writes, which is used to estimate the DRAM access energy consumption.

SGCNAX Configurations. Table 5 lists the major configurations of the SGCNAX that we explore. SGCNAX is equipped with eight PEs, each with a 1×16 MAC Array using double-precision floating-point multipliers. The SMB/IDMB/ODMB in each PE is sized so that the tiles of the matrix can fit into these local buffers. The accumulator buffer has 16 banks, each with 512 entries. The global buffer size is 1 MB.

TABLE 5

SGCNAX configurations

| PE parameters | Value | GCNAX parameters | Value |
|---|---|---|---|
| Multiplier width | 64 bits | # PEs | 8 |
| MAC Array | 1 × 16 | # Multipliers | 128 |
| Look-ahead FIFO | 16 entries | Global buffer | 1 MB |
| SMB | 320 KB | Accumulator Buffer Banks | 16 |
| IDMB | 4 KB | Accumulator Buffer Entries | 512 |
| ODMB | 256 KB | DRAM | HBM@128 GB/s |
| | | Permutation Network | 16*16 Omega Network |

Application-specific integrated circuit (ASIC) synthesis. To measure the area and power consumption, we model all the PE logic including the MAC Array, FIFOs, DRP, and DRAM. We use the Synopsys Design Compiler with the TSMC 40 nm library for the synthesis, and estimate the power using Synopsys PrimeTime PX. We set the clock frequency at 1 GHz. We use Cacti to estimate the area, power, and access latency of the on-chip buffers and FIFOs.

Baselines. We compare SGCNAX with three GCN accelerators (HyGCN, AWB-GCN, and GCNAX), and an SpMM accelerator (SpArch). Table 7 summarizes the characteristics of these baselines and SGCNAX.

TABLE 7

Characteristics of the accelerators

| Accelerator | Execution order | Compute engine | Loop fusion | Loop order | Tile size | Inner Spatial Dataflow |
|---|---|---|---|---|---|---|
| HyGCN | (AX)W [†] | Tandem engine | Yes | Static | Static | Inner product |
| AWB-GCN | A(XW) | Uniform engine | Yes | Static | Static | Inner product |
| SpArchG[§] | (AX)W | Uniform engine | No | Static | Static | Outer product |
| GCNAX | A(XW) | Uniform engine | Adaptive | Adaptive | Static | Outer product |
| SGCNAX | A(XW) | Uniform engine | Adaptive | Adaptive | Adaptive | Outer product |

[†] HyGCN uses edge-centric programming model for the aggregation phase, so their computation in the aggregation phase is not matrix multiplication. Nevertheless, the result of the aggregation phase is a large matrix that is used as the input to perform matrix multiplication in the combination phase.
[§] SpArchG uses SpArch (an SpGEMM accelerator) to process matrix multiplications in GCNs.

The baseline accelerators are scaled to be equipped with the same number of multipliers and DRAM bandwidth as GCNAX. Since HyGCN and AWB-GCN use single-precision floating-point numbers (32-bit) whereas SpArch uses double-precision (64-bit), we uniformly use double-precision for all accelerators to provide a fair comparison. As HyGCN uses a tandem-engine architecture having SIMD cores for the aggregation phase and systolic modules for the combination phase, the multipliers are divided into two groups in a ratio of 1:8 for the two engines according to its original configuration. We also resized the baseline accelerators to be equipped with the on-chip storage capacity. The DRAM bandwidth for all the accelerators is scaled to 128 GB/s. Note that as HyGCN uses edge-centric programming model for the aggregation phase, their computation in the aggregation phase is not matrix multiplication. Our simulator takes this into account and estimates the execution cycles and DRAM accesses according to HyGCN's dataflow. Although SpArch is not customized for GCNs, it is still selected as a baseline since it supports the key computations in GCNs. As SpArch does not mention how to support chain SpMM, we assume that it processes the chain SpMM sequentially without loop fusion. Hereafter we denote SpArchG as our simulated accelerator that uses SpArch to process chain SpMM.

6 Experimental Results 6.1 Area and Power

We obtain the area and power consumption of the SGCNAX PE under TSMC 40 nm technology. Table 6 summarizes the area and power of the major components in SGCNAX and its PE. A significant fraction of the PE area is contributed by memories (SMB, IDMB, and ODMB), which consume 82.9% of the total area, while the MAC array only consumes 7.1%. IDMB and ODMB are heavily banked for parallelization so they consume more area than SMB. The Data Dispatcher and Permutation Network only consumes 6.0% of the total area, which shows that the workload balancing module incurs a negligible area overhead in exchange for higher resource utilization.

TABLE 6

Hardware characteristics of SGCNAX

| PE Component | Area (mm²) | GCNAX Component | Area (mm²) |
|---|---|---|---|
| MAC Array | 0.46 (7.1%) | 8 PEs | 52.08 |
| SMB | 2.60 (39.9%) | Global Buffer | 8.42 |
| IDMB | 0.10 (1.5%) | Accumulator Buffer | 0.31 |
| ODMB | 2.70 (41.5%) | Control Unit | 0.28 |
| DRP | 0.41 (6.3%) | Data Dispatcher | 1.6 |
| PE Control Unit | 0.24 (3.7%) | Permutation Network | 2.3 |
| Total | 6.51 (100%) | | |

6.2 Performance

The performances of SGCNAX and the baselines measured by the total number of execution cycles are compared. On average, SGCNAX is 9.2×, 11.5×, 1.6×, and 1.2× faster than HyGCN, SpArchG, AWB-GCN and GCNAX, respectively. SGCNAX outperforms the baselines on all five datasets. The reasons for the high performance of SGCNAX are threefold. First, the execution order of the chain-SpMM of SGCNAX reduces the number of operations compared to that of HyGCN. Second, SGCNAX uses a uniform-engine architecture that can avoid the workload imbalance incurred by tandem-engine architectures. HyGCN can only achieve optimal (or desired) performance by carefully orchestrating the computational capacity of the combination and aggregation engines for a given dataset, but it inevitably incurs performance loss when accommodating different datasets with different computational requirements for the aggregation and combination engines. Finally, SGCNAX achieves the lowest DRAM accesses by adaptively configuring the dataflow for different datasets, which also explains why SGCNAX outperforms AWB-GCN and SpArch. The number of DRAM accesses has a strong impact on performance since it might be the system bottleneck. AWB-GCN uses the inner-product-based method for SpMM which incurs workload imbalance between PEs thereby degrading the performance. AWB-GCN addresses this inefficiency by a software scheduler and additional hardware modules that increase hardware complexity and introduce extra overhead. Since SpArchG is customized for sparse-sparse matrix multiplication, it achieves high performance when performing AX. However, the performance gain of SpArchG is hindered because 1) its processing order results in larger computation volume; 2) SpArchG is not good at processing dense-dense matrix multiplication. Furthermore, by alleviating inter-PE workload imbalance and using adaptive tile size, SGCNAX performs 1.2× better than GCNAX on average.

As for the speedup for specific datasets, SGCNAX performs 3.1-26.1× better over HyGCN, 4.1-25.6× better over SpArchG, 1.3-2.0× better over AWB-GCN, and 1.1-1.3× better over GCNAX. The performance gain on the Reddit dataset is not so significant because the execution order reduces computations by only 2.9× which is not that much compared to other datasets. Besides, the density of feature vectors in Reddit (larger than 50%) is higher than that of other datasets, which hinders the performance gains of SGCNAX because it still performs SpMM even though the input matrix is not that sparse.

6.3 DRAM Accesses

In regard to the number of DRAM accesses of the five accelerators, overall, SGCNAX achieves on average 9.7×, 7.5×, 2.9× and 1.2× reduction on DRAM accesses over HyGCN, SpArchG, AWB-GCN, and GCNAX, respectively. This benefits from the optimal tile size tuple, the data reuse optimization, and the adaptive loop fusion strategy. The DRAM access reduction varies across the datasets. Specifically, SGCNAX reduces DRAM accesses by a factor of 7.5-11.8× over HyGCN, 4.8-11.0× over SpArchG, 1.9-4.4× over AWB-GCN, and 1.1-1.4× over GCNAX. Since HyGCN and SpArchG use an inefficient execution order, they involve more computations that result in more DRAM accesses. AWB-GCN improves the reuse of the intermediate matrix. However, it sacrifices the reuse of the output matrix due to the limited on-chip storage size. Moreover, the tile sizes are not carefully tailored in the AWB-GCN accelerator. SGCNAX uses adaptive tile size thus saving DRAM accesses compare to GCNAX that uses static tile size.

6.4 Energy Consumption

In regard to the normalized energy consumption of the four accelerators, overall, SGCNAX achieves 12.3×, 9.9×, 3.0× and 1.3× energy savings compared to HyGCN, SpArchG, AWB-GCN, and GCNAX, respectively. This is because our accelerator has fewer DRAM accesses and better utilization of the computing resources.

Energy-delay product: Energy-delay product is used to verify that a dataflow does not achieve high energy efficiency by sacrificing processing parallelism. In regard to the normalized energy delay product (EDP) of the four accelerators, compared with the baseline accelerators, SGCNAX is 152.9, 159.1×, 4.8×, and 1.5× better in EDP averaged on the five datasets. The delay is calculated as the reciprocal of the number of execution cycles.

6.5 PE Granularity

Two factors may lead to performance degradation of SGCNAX. One is the workload imbalance across the PEs, the other is intra-PE MAC array fragmentation when we don't have enough work to fully populate the MAC array in each PE. we conduct a sensitivity analysis to quantify the effects of both factors on the accelerator performance. Assuming a fixed 128 multipliers for the accelerator, we sweep the total number of PEs from 16 (16 PEs, 8 MAC units per PE) down to 4 (4 PEs, 32 MAC units per PE). Clearly, SGCNAX with 4 PEs is more likely to suffer from intra-PE fragmentation because we may not have a large enough working set to fully populate the large MAC array. However, SGCNAX with 16 PEs is more likely to suffer inter-PE workload imbalance and requires a more complicated data dispatcher and permutation network. We found that SGCNAX with 8 PEs strikes a balance between the two factors.

7 Conclusion

We provide a scalable accelerator architecture for GCNs called SGCNAX. The salient feature of the architecture is that the dataflow can reconfigure the loop optimization variables to adapt to different GCN configurations, which simultaneously improves resource utilization and reduces data movement. The SGCNAX accelerator tailors the compute engine, buffer structure and size to support the optimized dataflow. Furthermore SGCNAX is capable to mitigate workload imbalances through hardware/software co-design approaches, e.g., the use of an outer-product-based computation architecture for SpMM computation, and a group-and-shuffle computing approach for concurrent PEs computation and simultaneous completion. We evaluated our architecture on five real-world graph datasets. The simulation results show that SGCNAX performs 9.2×, 1.6× and 1.2× better, and reduces DRAM accesses by a factor of 9.7×, 2.9×, and 1.2× compared to HyGCN, AWB-GCN, and GCNAX, respectively.

Convolutional Neural Networks (GCNs) have emerged as promising tools for graph-based machine learning applications. Given that GCNs are both compute- and memory-intensive, this constitutes a major challenge for the underlying hardware to efficiently process large-scale GCNs. We introduce SGCNAX, a scalable GCN accelerator architecture for the high-performance and energy-efficient acceleration of GCNs. Unlike prior GCN accelerators that either employ limited loop optimization techniques, or determine the design variables based on random sampling, we systematically explore the loop optimization techniques for GCN acceleration and provide a flexible GCN dataflow that adapts to different GCN configurations to achieve optimal efficiency. We further provide two hardware-based techniques to address the workload imbalance problem caused by the unbalanced distribution of zeros in GCNs. Specifically, SGCNAX exploits an outer-product-based computation architecture that mitigates the intra-PE (Processing Element) workload imbalance, and employs a group-and-shuffle approach to mitigate the inter-PE workload imbalance. Simulation results show that SGCNAX performs 9.2×, 1.6× and 1.2× better, and reduces DRAM accesses by a factor of 9.7×, 2.9× and 1.2× compared to HyGCN, AWB-GCN, and GCNAX, respectively.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

The invention claimed is:

1. A scalable graph convolutional neural network (GCN) accelerator, comprising:
    an accelerator circuit including:
        a processing element (PE) array that includes a plurality of PEs, wherein the plurality of PEs each include;
        a multiply-and-accumulate (MAC) array configured to perform multiplication and accumulation,
        a sparse matrix buffer configured to store data of a sparse matrix,
        an input dense matrix buffer configured to store data of a first dense matrix,
        an output dense matrix buffer configured to store data of a second dense matrix; and
        a PE control unit configured to:
            control data reading from the sparse matrix buffer, the input dense matrix buffer, and the output dense matrix buffer to the MAC array, and
            control data writing from the MAC array to the output dense matrix buffer.

2. The accelerator of claim 1, wherein the multiply-and-accumulate (MAC) array is configured to:
    receive a non-zero scalar and a first position associated with the non-zero scalar from the sparse matrix buffer;
    receive a first row vector and a second position associated with a first element in the first row vector from the input dense matrix buffer; and
    multiply each of element values in the first row vector with the non-zero scalar to produce a second row vector.

3. The accelerator of claim 2, wherein the MAC array is further configured to:
    receive a third row vector from the output dense matrix buffer according to a third position;
    add the second row vector to the third row vector to generate a fourth row vector; and
    store the fourth row vector to the output dense matrix buffer according to the third position.

4. The accelerator of claim 2, wherein:
    the data of the sparse matrix includes a block of an input feature matrix, and the non-zero scalar is a scalar of the block of the input feature matrix;

the data of the first dense matrix includes a block of an weight matrix, and the first row vector is a row vector of the block of the weight matrix; and the MAC array is configured to multiply each of element values in the first row vector of the weight matrix with the non-zero scalar of the input feature matrix to produce a second row vector.

5. The accelerator of claim 4, wherein the MAC array is further configured to:

receive a third row vector from the output dense matrix buffer according to a third position, wherein the second row vector and the third row vector each are a partial product for an intermediate matrix;

add the second row vector to the third row vector to generate a fourth row vector for the intermediate matrix; and store the fourth row vector to the output dense matrix buffer according to the third position.

6. The accelerator of claim 2, wherein:

the data of the sparse matrix includes a block of an adjacency matrix and, the non-zero scalar is a scalar of the block of the adjacency matrix;

the data of the first dense matrix includes a block of an intermediate matrix, and the first row vector is a row vector of the block of the intermediate matrix; and the MAC array is configured to multiply each of element values in the first row vector of the intermediate matrix with the non-zero scalar of the adjacency matrix to produce a second row vector.

7. The accelerator of claim 6, wherein the MAC array is further configured to:

receive a third row vector from the output dense matrix buffer according to a third position, wherein the second row vector and the third row vector each are a partial product for an output matrix;

add the second row vector to the third row vector to generate a fourth row vector for the output matrix; and store the fourth row vector to the output dense matrix buffer according to the third position.

8. The accelerator of claim 1, further comprising:

a processing unit configured to:

receive a graph input to be processed using a graph convolutional neural network having a plurality of layers, determine a partitioning of each of the plurality of layers of the graph convolutional neural network into a sequence of sublayers, and determine a processing order of the sublayers in the sequence; wherein:

a PE of the plurality of PEs is configured to process the graph input by processing the sublayers in the sequence according to the determined processing order.

9. The accelerator of claim 1, wherein the accelerator circuit further includes:

a data dispatcher coupled to the PE array and configured to distribute input data to the PE array; and a permutation network coupled to the PE array and configured to collect output data from the PE array.

10. The accelerator of claim 9, wherein:

the data dispatcher is configured to group a plurality of rows of a matrix into a plurality of groups according to a density-sorted rank order;

the data dispatcher is further configured to map the plurality of groups to the plurality of PEs of the PE array, respectively; and the permutation network is configured to unshuffle outputs from the plurality of PEs of the PE array.

11. The accelerator of claim 9, wherein:

the accelerator chip further includes an accumulator buffer; and the permutation network is configured to send output data from the PE array to the accumulator buffer.

12. The accelerator of claim 1, further comprising:

an off-chip memory external to the accelerator circuit;

wherein the accelerator circuit further includes:

a first buffer that is inside the accelerator chip; and a circuit control unit configured to control the reading of data from the off-chip memory to the first buffer.

\* \* \* \* \*